Aug. 9, 1932.  J. W. FRENCH  1,870,310
ANTIVIBRATION MEANS FOR THE SUPPORT OF OPTICAL OBSERVATION INSTRUMENTS
Filed March 14, 1930  3 Sheets-Sheet 1
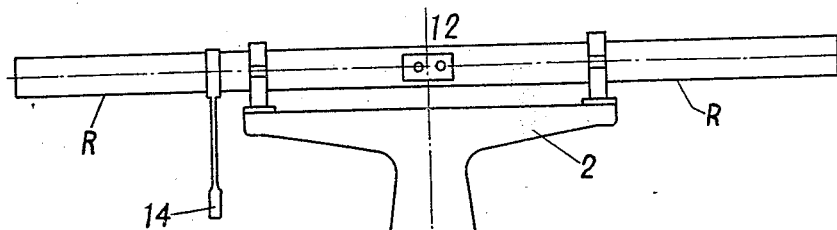
Fig. 1.
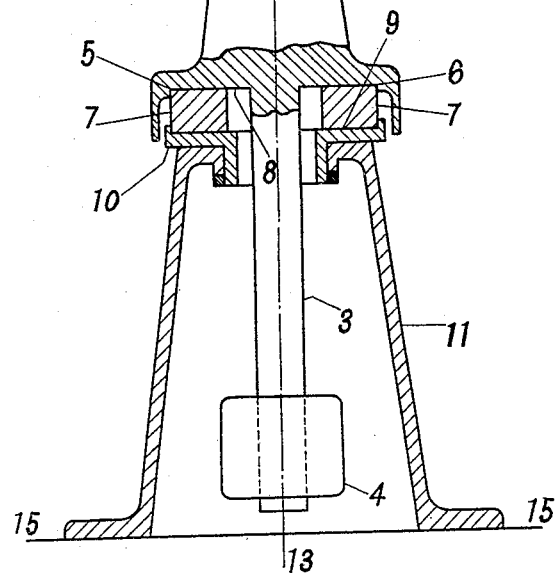
Fig. 2.
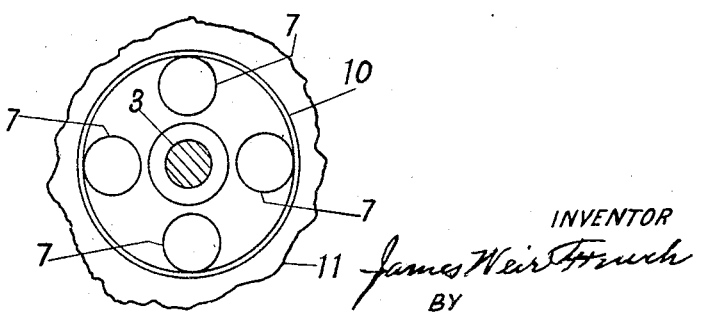

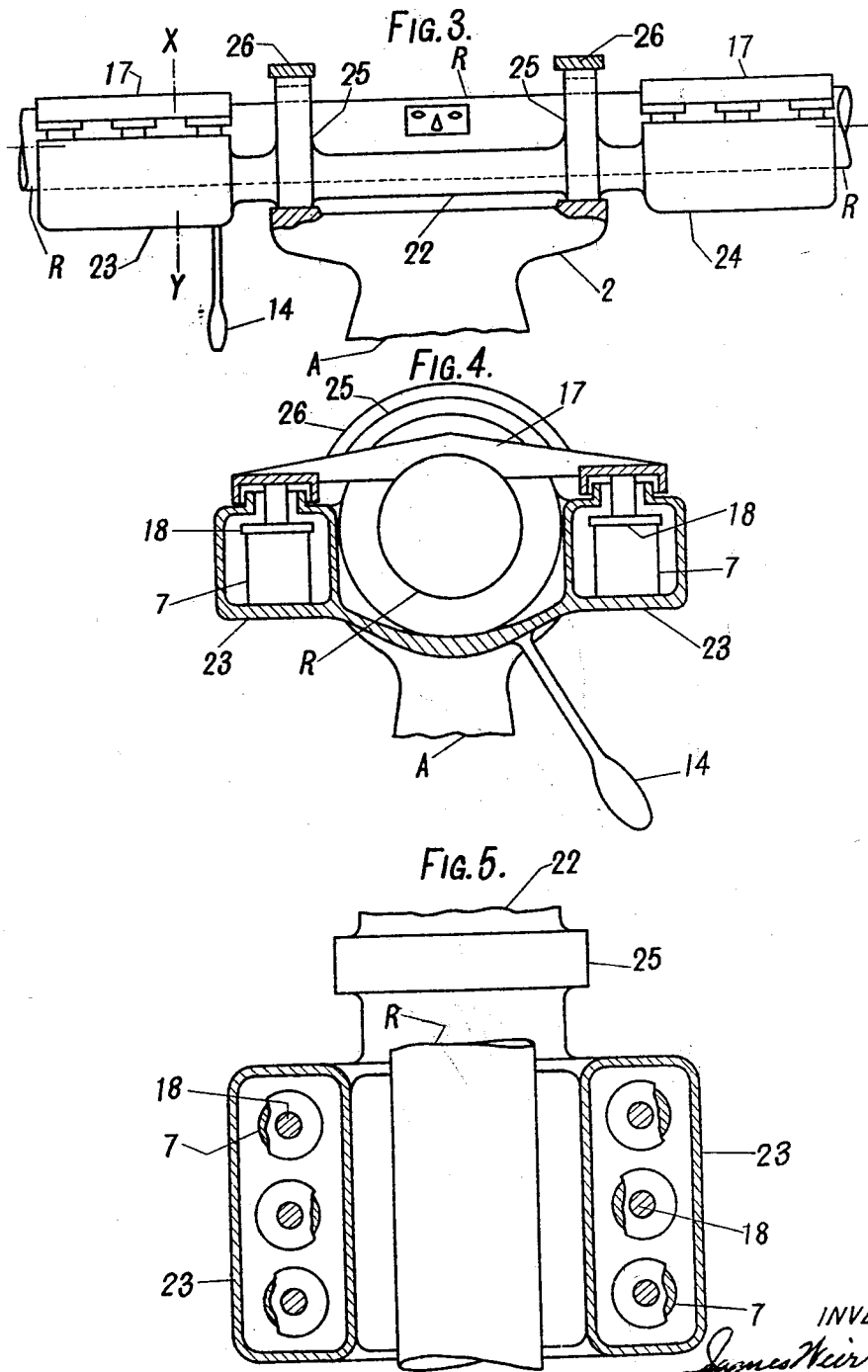

Aug. 9, 1932.  J. W. FRENCH  1,870,310
ANTIVIBRATION MEANS FOR THE SUPPORT OF OPTICAL OBSERVATION INSTRUMENTS
Filed March 14, 1930   3 Sheets-Sheet 3

INVENTOR
James Weir French
BY
Ritter Machlin & Hall
ATTORNEYS

Patented Aug. 9, 1932

1,870,310

UNITED STATES PATENT OFFICE

JAMES WEIR FRENCH, OF ANNIESLAND, GLASGOW, SCOTLAND, ASSIGNOR TO BARR AND STROUD, LIMITED, OF GLASGOW, SCOTLAND

ANTIVIBRATION MEANS FOR THE SUPPORT OF OPTICAL OBSERVATION INSTRUMENTS

Application filed March 14, 1930, Serial No. 435,802, and in Great Britain March 21, 1929.

This invention relates to improved antivibration supports for optical observation instruments, which in use are required to be movable angularly, say movable in azimuth or in altitude or in both, and the principal object of this invention is to prevent the transmission of objectionable vibration to such instruments.

According to this invention a support for an optical observation instrument comprises means for bearing the instrument, elastic means upon which the bearing means rest, the supporting surface between the bearing means and the elastic means lying substantially in a horizontal plane passing through the centre of gravity of the supported mass, and means for supporting the elastic means, the support including relatively rotatable parts so that the instrument may be angularly directed. The supports provided are such that for an instrument which is to be movable in azimuth or in altitude only the movement angularly is about an axis which intersects the centre of gravity of the mass; or for an instrument which is to be movable in azimuth and in altitude, the movement angularly in azimuth may be about a first axis which intersects the centre of gravity of the mass of a mounting for bearing the instrument and the instrument itself, and about a second axis which intersects the centre of gravity of the mass of the instrument and associated parts to be protected from vibration.

The self-damping elastic means may be composed of vesiculous material, say commercial sponge rubber, the vesicles of which are not ruptured, or other kindred material, or they may be partly composed of such material combined, say, with a spring or springs.

Some examples of the invention, in application to a rangefinder, will now be described with reference to the accompanying drawings, in which:—

Figure 1 is a front elevation partly in section, illustrating a first example. Figure 2 is a plan showing an arrangement of elastic means as may be used in Figure 1.

Figure 3 is a front elevation, Figure 4 is an end elevation partly in section, the section being about the line X Y of Figure 3, looking from left to right, and Figure 5 is a sectional plan, illustrating a second example.

Figure 6:
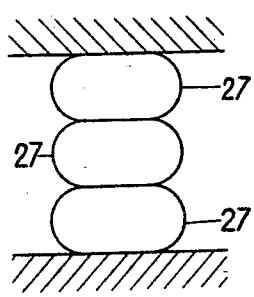
Figure 6 is an elevation illustrating a column of self-damping elastic material.

In the example illustrated at Figure 1, see also Figure 2, the upper part 2 of a mounting A bears a rangefinder R. Relatively to the mounting A the rangefinder R is movable angularly in altitude about its axis by means of a handle 14. As shown the axis of the rangefinder R is horizontal. The mounting A has a downward extension 3, provided with a weight 4. The vertical position of the weight 4 can be so adjusted that the centre of gravity of the rangefinder R and the mounting A may be made to lie at the position 5, 6, where self-damping elastic means 7 are provided between an under surface 8 of the mounting A and an upper surface 9 of an intermediate member forming a seating 10 which fits on the head of a pedestal 11 which is fixed to the deck of a ship, say the deck of a destroyer. The seating 10 is rotatable in azimuth, and with it the elastic means 7, the mounting A and the rangefinder R are movable angularly in azimuth about the vertical axis 12, 13, which intersects the centre of gravity of the mass of the mounting A and the rangefinder R. In this example, small vibrational displacements, vertically and laterally, of the base 15, are communicated through the surface 9 to the elastic means 7 where they are absorbed, and are not communicated to any objectionable extent to the under surface 8 of the mounting A, which surface 8 lies near the centre of gravity of the rangefinder R and the mounting A. Thus, the vibrations are not imparted to the rangefinder R.

Figure 2 shows an example of the elastic means 7 which may be used in Figure 1. This example comprises four columns 7 separated from one another, and they form the only connection which there is between the surface 9 and the surface 8, see Figure 1. Thus, free relative movement between the surface 9 and the surface 8 is ensured. In another arrangement the elastic material may be in the form of an annular ring.

In the example illustrated at Figures 3, 4 and 5, the rangefinder R is provided with bearing arms 17, having downwardly extending projections 18 the under surfaces of which rest upon elastic means 7 which are within cases 23 and 24. The action of the elastic means 7 so far as small displacements, vertically and laterally, arising from vibration are concerned, is as already described in connection with Figure 1. Instead of separate columns 7 a single block of elastic material may be used. In this arrangement the cases 23 and 24 are movable with a cradle 22, the cradle having journals 25 which fit in bearings 26 on the upper part 2 of the mounting A. Thus, the rangefinder R is connected with the cradle 22 by means of the elastic means 7, and thereby is protected against vibration, and the cradle 22 and with it the cases 23 and 24, the arms 17 and the rangefinder R are movable angularly in altitude about the longitudinal axis of the rangefinder R by means of the handle 14. The axis of the rangefinder intersects the centre of gravity of the mass of the rangefinder R and associated parts which are protected by the means 7 from vibration.

The example illustrated at Figure 1 may be used in conjunction with the example illustrated at Figures 3, 4 and 5 for an instrument which is movable in azimuth and in altitude.

Figure 7:
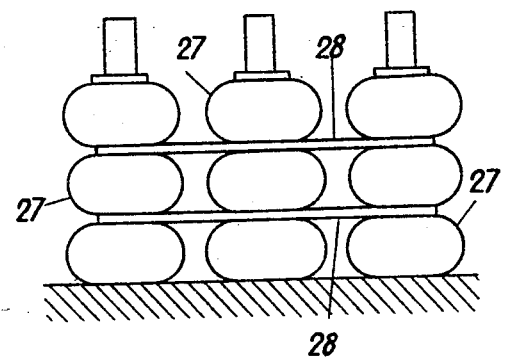
Figure 7 is an elevation illustrating a group of columns of self-damping elastic material.

Commercial sponge rubber the vesicles of which are not ruptured is a self-damping elastic material suitable for use in accordance with this invention. The sponge rubber may be in the form of columns or in the form of annular or rectangular blocks, according to requirements. The columns may be built up in layers of discs, as indicated in Figure 6, the discs 27 may be cemented together. When several columns as indicated in Figure 5, are used, the discs 27, see Figure 7, may be connected together in horizontal planes by means of diaphragms 28 which may be of rubber or sponge rubber or other suitable material.

Figure 8:
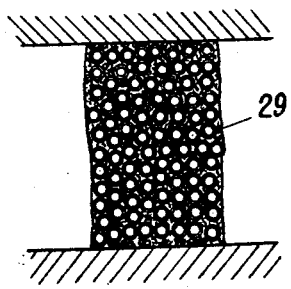
Figure 8 is a sectional elevation illustrating a column of self-damping material.

Experiment has shown that the best damping effect is obtained from sponge rubber which has the vesicles unruptured, but for heavy loads, it may be desirable to use elastic means comprising vesicles the walls of which are thicker and stronger than can be obtained from any commercial form of rubber. In such cases the elastic means, as indicated in Figure 8, may comprise a number of individual elastic balls 29, having walls of the appropriate thickness, the balls being cemented together, when necessary, by rubber or other material to form a vesiculous conglomerate.

Figure 9:
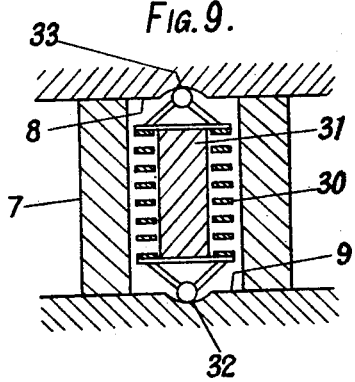
Figure 9 is a sectional elevation and Figure 10 is a sectional plan illustrating self-damping elastic means.
Figure 10:
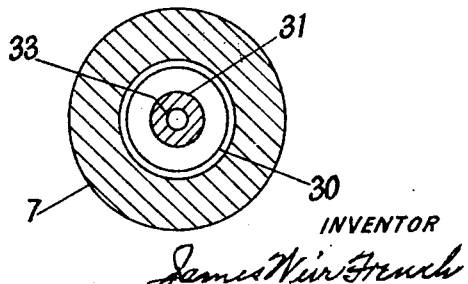

In other arrangements, where the vibration is not excessive and where the total loads are heavy, it may be desirable to carry a portion of the total load on springs, the remainder of the load being carried upon self-damping elastic material. In such an arrangement, see Figures 9 and 10, the elastic means 7 may be of annular form enclosing a spring 30 with a core of self-damping material 31—as for example, sponge rubber—the spring 30 being provided with pivot ends 32 and 33, which bear upon the surfaces 9 and 8.

I claim:—

1. A support for an optical observation instrument comprising means for bearing the instrument, elastic means upon which the bearing means rest, the supporting surface between the bearing means and the elastic means lying substantially in a horizontal plane passing through the centre of gravity of the supported mass, and means for supporting the elastic means, the support including relatively rotatable parts so that the instrument may be angularly directed.

2. A support for an optical observation instrument comprising means for bearing the instrument, elastic means upon which the bearing means rest, the supporting surface between the bearing means and the elastic means lying substantially in a horizontal plane passing through the centre of gravity of the supported mass, and means for supporting the elastic means including relatively rotatable parts so that the instrument may be angularly directed.

3. A support for an optical observation instrument comprising means for bearing the instrument, elastic means upon which the bearing means rest, the supporting surface between the bearing means and the elastic means lying substantially in a horizontal plane passing through the centre of gravity of the supported mass, an intermediate member upon which the elastic means are carried, and means for rotatably supporting the intermediate member so that the instrument may be angularly directed.

JAMES WEIR FRENCH.